Fig. 1.

INVENTORS.
ALFRED O. REYNOLDS, RICHARD H. PLOW,
AND CHARLES W. SNYDER
BY
Harold B. Hood
ATTORNEY.

March 6, 1962 A. O. REYNOLDS ET AL 3,023,806
MACHINE FOR FORMING MOLDED FIBRE ARTICLES
Filed Feb. 12, 1957 8 Sheets-Sheet 3

INVENTORS.
ALFRED O. REYNOLDS, RICHARD H. PLOW,
AND CHARLES W. SNYDER
BY
Harold B. Hood
ATTORNEY.

INVENTORS.
ALFRED O. REYNOLDS, RICHARD H. PLOW,
AND CHARLES W. SNYDER
BY
Harold B. Hood
ATTORNEY.

United States Patent Office  3,023,806
Patented Mar. 6, 1962

3,023,806
MACHINE FOR FORMING MOLDED
FIBRE ARTICLES
Alfred O. Reynolds, Indianapolis, and Richard H. Plow and Charles W. Snyder, Lebanon, Ind., assignors, by mesne assignments, to Willis-Reynolds Corp., Lebanon, Ind., a corporation of Indiana
Filed Feb. 12, 1957, Ser. No. 644,703
10 Claims. (Cl. 162—385)

The present invention relates to a machine for producing molded articles from pulp or fiber; and the primary object of the invention is to provide a machine of the character described which shall be completely automatic in its performance of the steps involved ot produce articles of predetermined shape from a suspension of pulp in liquid to the point at which self-sustaining articles are deposited on a conveyor to be carried through a drying stage, or other operation.

A further object of the invention is to provide, in such a machine, automatic control devices whereby the machine will be advanced, step by step, to gather fiber to suitable thickness and in a predetermined form, separating the fiber from the major portion of the water in which it has been suspended, compact the deposited fiber in its predetermined form to eject further moisture therefrom, then discharge the formed articles, in such a fashion as not to damage or deform them, and then clean the molds from which the articles have been discharged, in preparation for a further cycle.

A further object of the invention is to provide improved means for automatically subjecting the molds, at proper times, and in proper sequence, to an interior vacuum, to an interior superatmospheric pressure and to a flow of wash water therethrough. A still further object is to provide improved means for indexing such a machine and for controlling, at the same time, the connection of the molds to a source of air under pressure, a source of vacuum, and a source of water under pressure.

A further object of the invention is to provide novel and improved means for delivering formed but fragile articles of the character here under consideration from the forming molds to a support, without danger of multilation of the fragile articles.

A further object of the invention is to provide, in such a transfer mechanism, means to receive such formed articles directly from the molds substantially without shock upon the articles and to deposit the articles gently upon a transfer plate, together with means for delivering the articles, in upright condition, from the transfer plate to a suitable support such as, for instance, a conveyor upon which the articles may be carried through a drying stage.

A still further object of the invention is to provide means whereby, after the articles are deposited on such a transfer plate, the plate will be advanced to a position overlying the support, conveyor or the like, while carrying the articles, and then will be precipitately retracted so suddenly that the inertia of the articles will prevent them from partaking of the retractive movement of the transfer plate, and they will be dropped, through a very short distance, onto the support.

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

*Frame Assembly*

Figure 1:
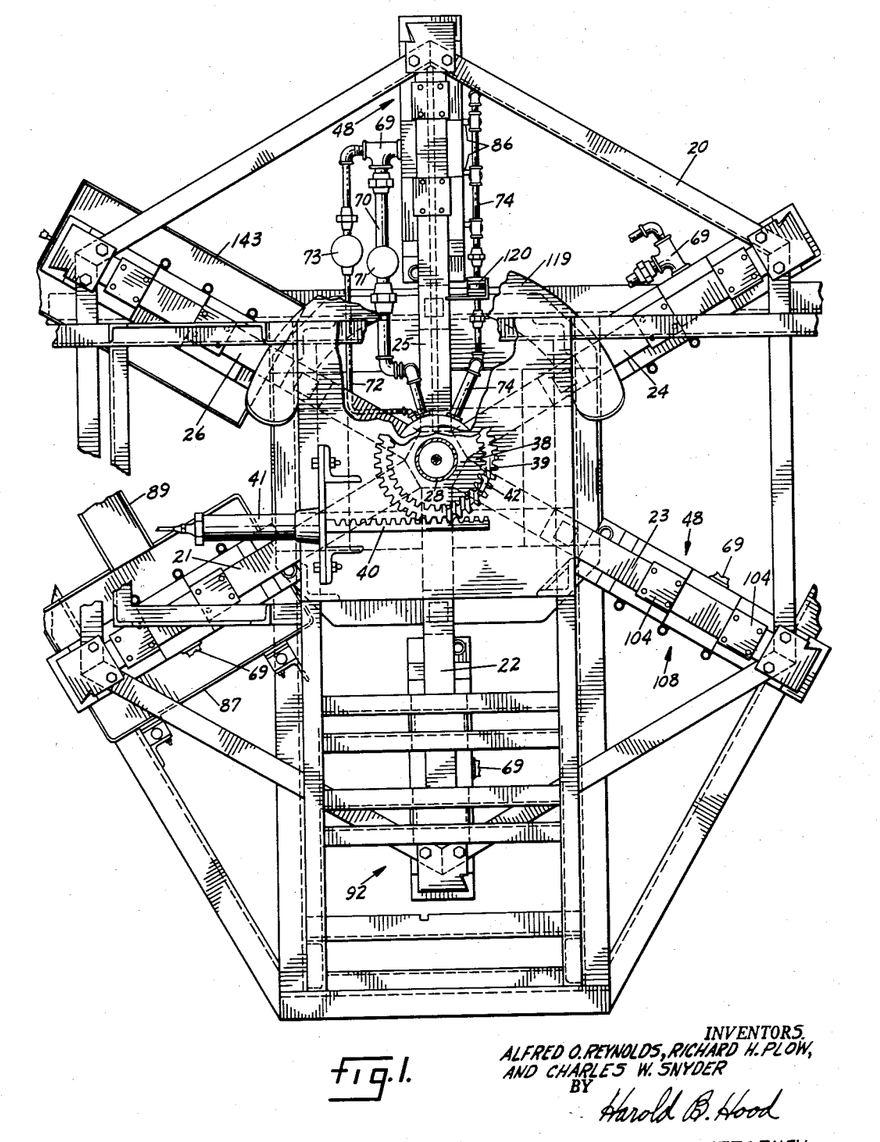
FIG. 1 is a plan view of a machine constructed in accordance with the present invention, parts being omitted for clarity of illustration.

Referring to FIG. 1, the reference numeral 20 indicates generally a rotatable carriage which, in the present illustration of the machine, is hexagonal in plan. The carriage comprises, as well, six radially extending, equiangularly spaced arms 21, 22, 23, 24, 25 and 26 suitably secured, at their inner ends, to a collar 27 (FIG. 3) which is fixedly supported upon a shaft 28 intermediate the ends thereof. The shaft 28 is mounted for rotation upon a fixed axis through the medium of plates 29 and 30 supported, in vertically spaced relation, from a frame indicated generally by the reference numeral 31. Bearing members 32 and 33 arranged upon opposite sides of the plate 29 support the shaft for rotation from said plate, and similar bearing members 34 and 35 support the shaft for rotation from the plate 30.

Additionally, the carriage is provided with an annular series of legs supporting rollers 36 which travel upon an annular trackway 37 supported from the frame 31.

Freely sleeved on the shaft 28 is a pinion 39 with which meshes a rack 40 (FIG. 1) fixed to move with the piston of a fluid motor 41. Fixed to the shaft 28 is a further pinion or ratchet wheel 38; and a pawl 42 is pivotally supported on the upper surface of the pinion 39 in cooperative association with the teeth of the pinion 38 so that, as the pinion 39 moves in a counter-clockwise direction in response to movement of the rack 40 toward the right, the pawl will engage the teeth of the pinion 38 to carry the shaft 28 therewith; but, as the pinion 39 moves in a clockwise direction in response to the movement of the rack 40 to the left, the pawl will ratchet past the teeth of the pinion 38 without affecting the shaft 28.

A plate 43 is fixed to the shaft 28 below the bearing member 33, and said plate bears against, and seals the upper end of, an air manifold 44. A sealing plate 44' is received within the manifold 44 at its lower end and bears against a water manifold 45. Immediately below the water manifold is mounted a vacuum manifold 46, a sealing plate 46' being interposed therebetween. A further plate 47 bears against the lower end of the vacuum manifold 46.

Mold Block Assembly

Each of the arms 21 to 26 supports, from its lower surface adjacent its outer end, a mold block indicated generally by the reference numeral 48, and illustrated in detail in FIGS. 5 to 8. Each such block includes a core box 49 formed with a plurality of cavities 50, each provided, near its open lower end, with an internal ledge 51. A core 52 is arranged in each such cavity, such core being generally of the configuration of the article to be formed, and including an external lip 53 adapted to bear against the outer surface of the ledge 51 of the cavity in which it is mounted to close the open mouth of its cavity. Each core is formed with a plurality of ports 54 angularly spaced about its side walls, and with a further plurality of ports 55 in its floor, whereby the interior of the core is placed in constant communication with the interior of its cavity.

Figure 8:
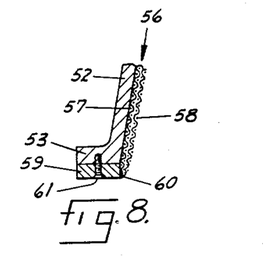
FIG. 8 is an enlarged, fragmentary section showing the construction of a reticulate mold form and the manner in which it is preferably assembled with a core of the type illustrated in FIGS. 5, 6 and 7.

A mold form 56 is provided for each core, a preferred form thereof being illustrated in FIG. 8. As is clearly shown therein, each such mold form comprises two nested baskets, the outer one 57 being formed of relatively heavy screening and the inner one 58 being formed of relatively fine screening. A ring 59 snugly embraces the mouth 60 of each mold form and is soldered thereto, and screws 61 pass through said ring and enter tapped sockets in the lip 53 of a core to secure each mold form in place in a core. Each core, in turn, is secured in place in a core box cavity by means of screws 62 entering tapped holes in the peripheral surface of its lip 53.

Each core box further comprises a manifold plate 63 formed with a longitudinally extending, blind bore 64 suitably plugged at its open end. Ports 65 open through the under side of the manifold 63 in registry with ports 67 formed in the core box 49, each such port 67 communicating with one of the cavities 50 in the core box; and a nipple 66 has one end press fitted into each of the ports 67 and its other end slip fitted into the corresponding port 65 of the manifold 63. The manifold is suitably secured to the core box, as by screws or bolts 572.

The manifold is further formed with a transverse bore 68 communicating with the bore 64 and adapted to receive one arm of a T-fitting 69.

Piping and Valving Systems

An air pipe 70, having a solenoid valve 71 connected therein to control flow therethrough, is connected to the stem of the T-fitting 69 and to the air manifold 44. A water pipe 72 is connected to the other arm of the T-fitting 69 and to the water manifold 45, a solenoid valve 73 being connected in said pipe 72 to control flow therethrough. A vacuum pipe 74 is connected to the vacuum manifold 46 and is controlled by a vacuum valve 75.

The shaft 28 is hollow from end to end to provide an air passage opening centrally into the interior of the air manifold 44. Suitably supported on the frame 31 is a pressure tank 77 in which a supply of air under predetermined pressure is maintained by a pump (not shown); and a pipe 78 leads from said tank to a T-fitting 79, the lower end of which is connected, through a swivel joint 81, with the upper end of the interior of the shaft 28. The other branch of the T-fitting 79 is suitably closed by a gland 80 through which extends a water supply pipe 82 passing downwardly through the shaft 28 and communicating, at its lower end, with the interior of the water manifold 45.

A vacuum tank (not shown) is held at a predetermined subatmospheric pressure by means of a vacuum pump (not shown) and a line 83 leads from said tank, through a swivel joint 84, to the lower end of the interior of the lower section 28' of the shaft 28, which communicates with the interior of the vacuum manifold 46. Each cavity 50 is provided with a port 85, and conduits 86 provide communication between the vacuum pipe 74 and the respective ports 85.

It will be understood, of course, that the above arrangement of air, water and vacuum piping and valving is provided for each of the arms 21 to 26, though specific illustrations thereof are not repeated in the drawings.

Figures 3, 3A:
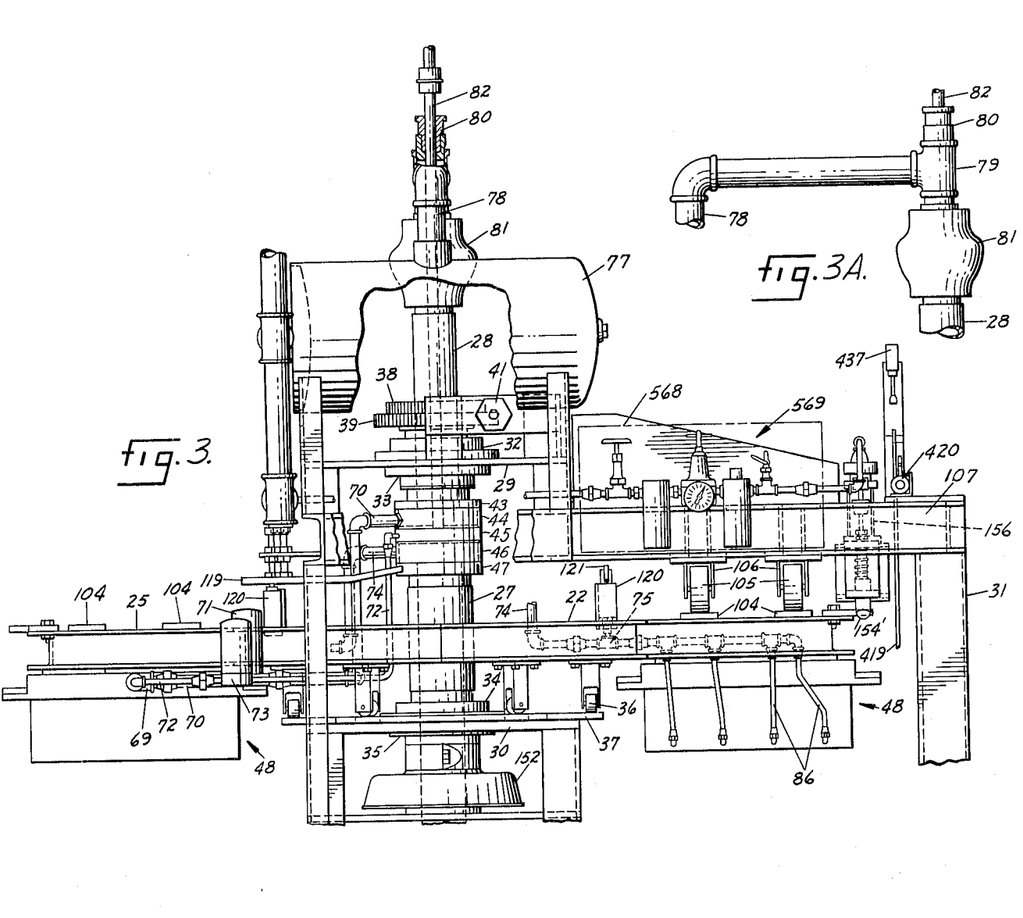
FIG. 3 is a fragmentary elevation of the upper portion of the machine, taken from substantially the same viewpoint.
FIG. 3A is a fragmental elevation of the air connection, viewed from the right of FIG. 3.

Pressure regulating valving, as illustrated at 569 in FIG. 3 is provided in the fluid supply lines to the several fluid motors embodied in the machine. Since such means is more or less conventional and forms no part of the present invention, and in order to avoid confusing interference with the illustration of more important features of the machine, we have enclosed the regulatory grouping in a broken outline identified by the reference numeral 568, and have represented the other occurrence of such a grouping only by such a broken outline and the numeral 568.

Slurry Pick-Up or Feed Station

At a point which, in the illustrated position of the machine, registers with the arm 21, we provide a slurry tank 87, open at its top and supported from the piston of a fluid motor 90. A pipe 88 leads from a slurry supply (not shown) and through a flexible hose 88' to the tank 87, and the tank is provided with an overflow trough 89 from which excess slurry is returned, through means not illustrated, to the slurry supply. The motor 90 is dominated, by a solenoid valve, 91, (FIG. 14) in a manner later to be described, to raise the tank, at an appropriate time, sufficiently to immerse the core box to permit the deposition of a suitable layer of fiber on the interior surfaces of the mold forms, while vacuum is applied to the cavities 50.

Bag Press or Compression Station

Figure 14:
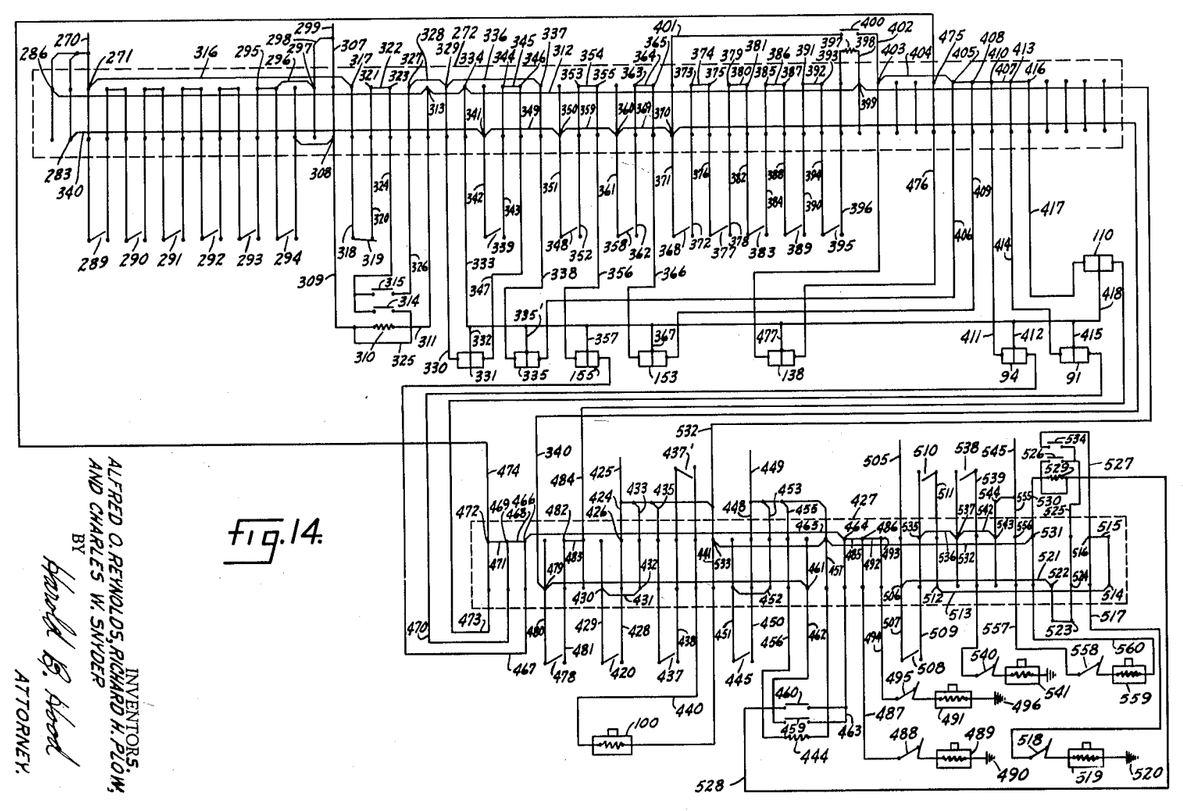

When the arm 21 is in registry with the slurry tank, the arm 22, as shown, is in registry with a bag press station indicated generally by the reference numeral 92. At that station, a fluid motor 93, controlled by a solenoid valve 94, (FIG. 14) supports a carrier 95 which is mounted for reciprocation relative to the frame and which supports a plurality of inflatable bags 96 of rubber or similar suitable material. Each such bag 96 registers with a core and mold form in the core box 49 which, at a given moment, is disposed at the bag press station. Each bag is supported upon a hollow unit 97 with which communicates a flexible tube 98 connected to an air pipe 99 dominated by an electrically actuated valve 100 (FIG. 14). A pair of pins 101 is carried by the element 95; and as said element 95 rises to enter the bags into the associated mold forms, said pins enter perforations 102 in ears formed at the opposite ends of the header 63 to assure absolute registry. Rings 103, which may be integral flanges on the units 97 for each of the bag assemblies, bear tightly against the rings 59 of the several mold forms when the carrier 95 is in its uppermost position.

At this station, a rather heavy pressure is exerted upwardly against the core box 49 and its supporting arm. Consequently, it is desirable to provide two transversely extending plates 104 on the upper surface of each arm, which plates engage, while the arm is at the bag press station, with rollers 105 supported from brackets 106 depending from a stationary frame member 107, said rollers and said brackets sustaining the above-mentioned pressure to prevent distortion of the arm.

Plug Carrier or Freeing Station

In the illustrated position of the parts, the arm 23 is disposed at a plug carrier station 108. At this station, a fluid motor 109, dominated by a solenoid valve 110, (FIG. 14) supports a bar 111 and a second bar 112 cooperating to define a carrier. The bars 111 and 112 mount a series of vertical pins 113 each of which carries, at its upper end, with a press fit, a plug 114 shaped to conform to the internal shape of the articles being formed in the machine. Each pin 113 passes freely through a hole in the bar 111 and a hole in the bar 112, and is supported by a spring 115 sleeved on the pin and confined between the plug 114 and the bar 111. Stop nuts 116, threadedly mounted on each pin 113, normally bear against the lower surface of the bar 111 to limit upward movement of each pin 113 under the influence of its spring 115. Guide rods 117 depend from the bar 112 and pass through guide holes in a platform 118 fixedly supported from the machine frame. The parts are so proportioned and designed that, as the carrier 108 is moved upwardly by actuation of its motor 109, the plugs 114 will enter, and seat themselves in, the articles carried in the several cores of the associated core box, just before the end of the motor stroke is reached; so that the springs 115 will be slightly compressed at the time when the carrier 108 reaches the upper end of its stroke.

An arcuate cam plate 119 is fixedly supported from the frame above the plane of the arms 21 to 26, and one end thereof is disposed a little less than 60° beyond the position of the plug station 108. On each arm, and in cooperative association with the vacuum valve 75 thereof, is mounted a valve actuator 120 (FIG. 3) which includes a roller 121 mounted upon a reciprocable plunger and adapted to engage the cam plate 119 as its associated arm moves into registry therewith. As the roller 121 moves along the cam 119, it is depressed sufficiently to close the valve 75 with which it is associated. As is clearly shown in FIG. 1, the cam plate 119 has an angular extent slightly in excess of 120°; and of course each valve 75 will be held closed throughout its travel along the length of the cam plate 119.

*Discharge Station*

Figure 2:
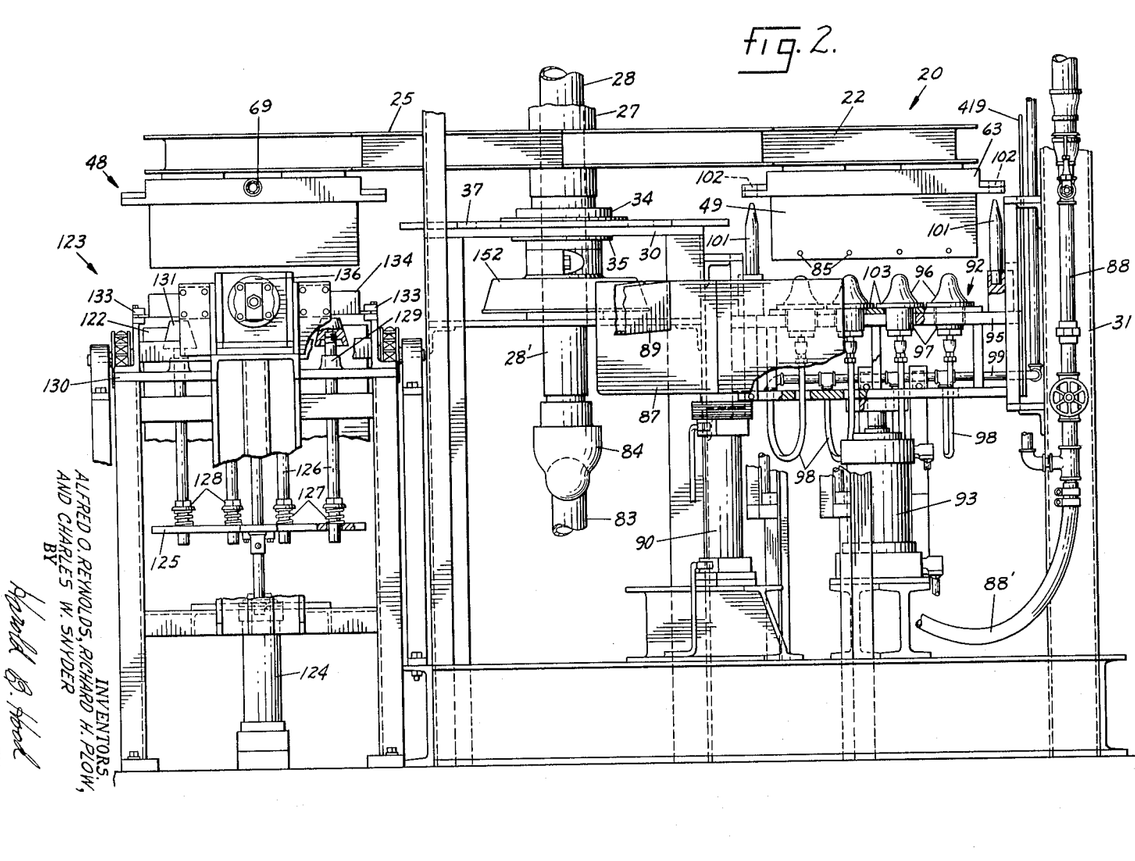
FIG. 2 is a fragmentary elevation of the lower portion of the machine, as viewed from the left of FIG. 1, parts being broken away and other parts being shown in section for clarity of illustration.
Figure 9:
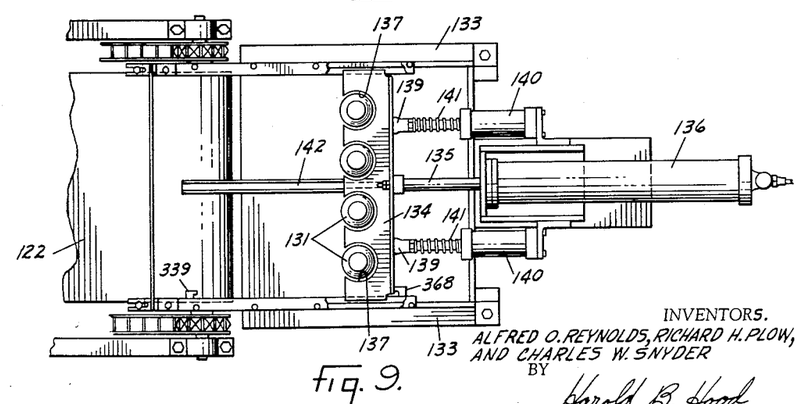
FIG. 9 is a plan view of transfer mechanism forming a feature of the present invention and shown in rear elevation in FIG. 2.
Figure 10:
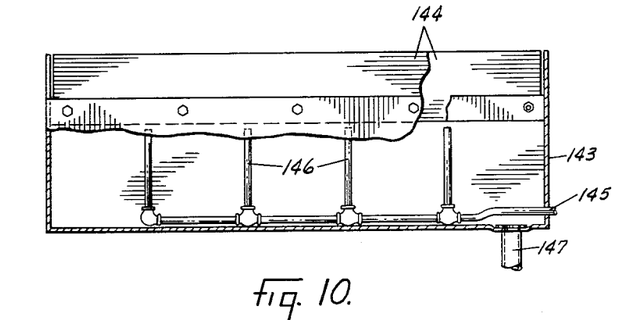
FIG. 10 is an elevation, partly in section, of a wash tank utilized in the machine of the invention.

At the station midway between the ends of the cam plate 119, the molded articles are discharged from the core boxes and delivered to a conveyor 122 (FIGS. 2 and 9) to be carried to a drying station (not shown). Such delivery is accomplished through transfer mechanism indicated generally by the reference numeral 123, and illustrated in FIGS. 2 and 9.

Near the station with which the arm 25 is shown in registry, a fluid motor 124 is mounted on a vertical axis and its piston supports a platform 125 from which is supported a series of rods 126 equal in number to the mold cavities in the core box supported from the arm 25. As shown, each rod 126 passes freely through an opening in the platform 125 and is resiliently supported therefrom by a spring 127 confined between the platform and a nut 128 adjustably mounted on the rod 126. Each rod is further supported and guided in a bearing sleeve 129 formed or mounted on a stationary platform 130; and, at its upper end, each rod carries a plug 131, having a threaded seat on the rod end, and externally formed to correspond substantially to the internal shape of the articles being formed on the machine. The operation of the motor 124 is dominated by an electrically actuated valve 132 (FIG. 14).

At a level immediately above the retracted position of the plugs 131, we provide a pair of horizontal guide rails 133 extending from a point behind the plugs 131 to a point overlying, and very slightly spaced above, the adjacent end of the conveyor 122. Guided for reciprocation in the rails 133 is a transfer plate 134 fixed to the piston 135 of a fluid motor 136. As is most clearly shown in FIG. 9, the plate 134 is formed with a series of apertures 137 therethrough, each aperture being aligned, in the retracted position of the plate 134, with one of the plugs 131. As will be seen, the diameter of each aperture 137 is very slightly greater than the major diameter of its associated plug; and it is to be noted that the aperture diameter is slightly less than the external diameter of the mouth of the article being produced. As will be more fully explained hereinafter, when a core box is registered with the transfer mechanism, the motor 124 will be actuated to lift the plugs 131 through the plate apertures 137 to enter the mouths of the articles in the mold forms of the registering core box. Thereupon, a blast of air under pressure will be introduced into each mold cavity to dislodge the molded articles therefrom and to deposit them upon the plugs 131. Now, the plugs 131 are returned to retracted position; and as they pass through the apertures 137, the formed articles will engage the plate 134 to be arrested thereby and stripped from the plugs 131 as the latter return to their illustrated positions. Thus, the articles being produced are left standing on the plate 134.

*Transfer Mechanism*

An electrically actuated valve 138 (FIG. 14) dominates the motor 136; and, after retraction of the plugs 131, said motor will be actuated to move the plate 134 forwardly (toward the left in FIG. 9) to a position overlying the adjacent end of the conveyor belt 122. When the plate 134 attains this position, the valve 138 will again be actuated to reverse the motor 136. The forward motion of the motor is relatively slow; but the reverse motion thereof is extremely fast, with the consequence that the plate 134 is jerked to the right so suddenly that, as a result of the inertia of the articles supported thereon, the plate escapes from beneath those articles, without upsetting them, and they are dropped the very small distance to the surface of the moving belt 122. It may be noted that any upsetting tendency which may be exerted upon the articles by the sudden retraction of the plate 134 is in a direction opposite to the direction of force exerted upon the articles by the belt 122, which is moving toward the left as viewed in FIG. 9. It has been found that the illustrated mechanism results, in a very high proportion of operations, in satisfactorily depositing the articles, in upright condition, on the belt 122 whereby they are carried to a drying station.

Preferably, we provide bumpers 139 to engage and stop the plate 134 in its retracted position, said bumpers being associated with pneumatic dampers 140 and being provided with coiled springs 141 sleeved thereon. Preferably, a stationary guideway 142 is provided to be engaged by a projection (not shown) carried by the piston rod 135 to assist in guiding the transfer plate mechanism in its movements.

*Wash Tank Station*

In a position to register with an arm in the illustrated position of the arm 26, we provide a wash tank 143 the upper portions of whose walls are preferably defined by flexible, rubberoid flaps 144 which may be displaced by the mold boxes as they move into and out of registry with said tank. A water supply line 145 enters the tank 143 and is provided, within the tank, with ejection tubes 146 equal in number, and adapted to register with, the cores of a core box in registry with the wash tank, whereby water may be directed into the interiors of the mold forms carried by such a core box to wash away any residual fibers adhering thereto. A return line 147 leads from the bottom of the wash tank 143 to waste.

*Manifolds*

Figure 11:
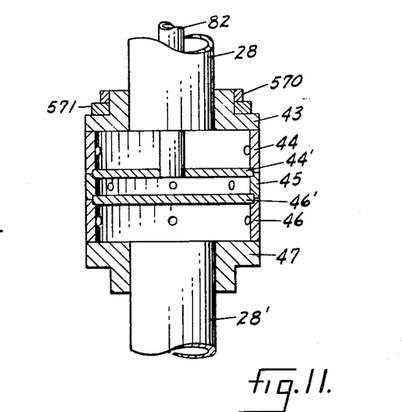
FIG. 11 is an enlarged, fragmental section showing the manifold structure preferably used in the machine.

The details of the air, water and vacuum manifolds are illustrated in enlarged section in FIG. 11, wherein it is clearly seen that the lower end of the upper section of the shaft 28 opens freely into the chamber within the manifold 44, while the water supply pipe 82 projects through that chamber and is welded into a central aperture through the plate 44', and into a central bore in the manifold 45. Similarly, the lower section 28' of the shaft 28 opens into the chamber of the manifold 46 which is sealed from the central bore of manifold 45 by the plate 46'. Radial bores or passages lead from the chambers within the manifolds 46 and from the central bore of the manifold 45, to the external peripheries of said elements, for connection to the several pipes above described.

Bag Mounting Details

Figure 12:
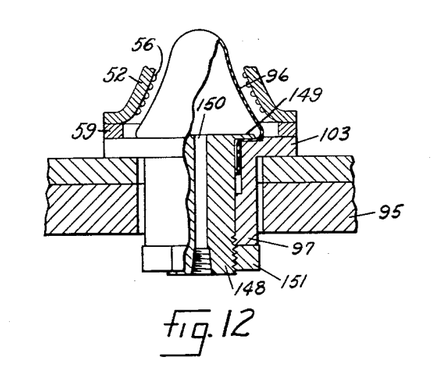
FIG. 12 is an enlarged section showing the preferred means for mounting the inflatable and expansible air bags used at one stage in the machine.

In FIG. 12, we have shown the details of a preferred form of mounting for the bags 96. Each bag support 97 comprises an elongated cylindrical element projecting through an opening in the platform 95; and the ring 103 may preferably be formed as an integral flange on the element 97. Passing through a central bore in the element 97 is a clamp member 148 having a thin, radially-outwardly projecting flange 149 at its upper end, and having an air passage 150 therethrough. As is clearly shown, the flanged end of the element 148 may be entered in the mouth of a bag 96, with the periphery of the bag mouth underlying the flange 149. Now, when the element 148 is positioned as shown in FIG. 12, and a nut 151 is tightened upon the threaded lower end of said element, the periphery of the bag mouth will be tightly clamped between the flange 149 and the adjacent surface of the ring portion 103 of element 97.

Carriage Indexing Means

Since the rotating carriage 20 and its associated parts develops a considerable momentum, and since accurate registry of the parts carried thereby with the operating mechanisms at the several stations is quite important, means must be provided for accurately stopping the carriage in proper registry with the several stations. As shown, we provide a hydraulic brake 152 closely similar to conventional automobile brakes, with the drum or the shoes fixed to rotate with the shaft 23′ and with the shoes or the drum fixed with respect to the frame. An electrically actuated hydraulic pump 153 (FIG. 14) is provided for setting and releasing the brake.

In addition to the brake, and in order to ensure accurate registry of the carriage as it progresses, step-by-step, a stop pin 154 is supported from the frame 31 in position to engage, when advanced, the leading edge of an arm occupying the position of the arm 22 in FIG. 1, and a hydraulic motor 156 is positioned to advance and retract the pin 154, under the control of a solenoid valve 155 (FIG. 14). A spring-actuated latch 154′ (FIG. 4) engages behind the arm when the arm meets the pin 154, to hold the carriage rigidly in position.

Operation

Figure 13:
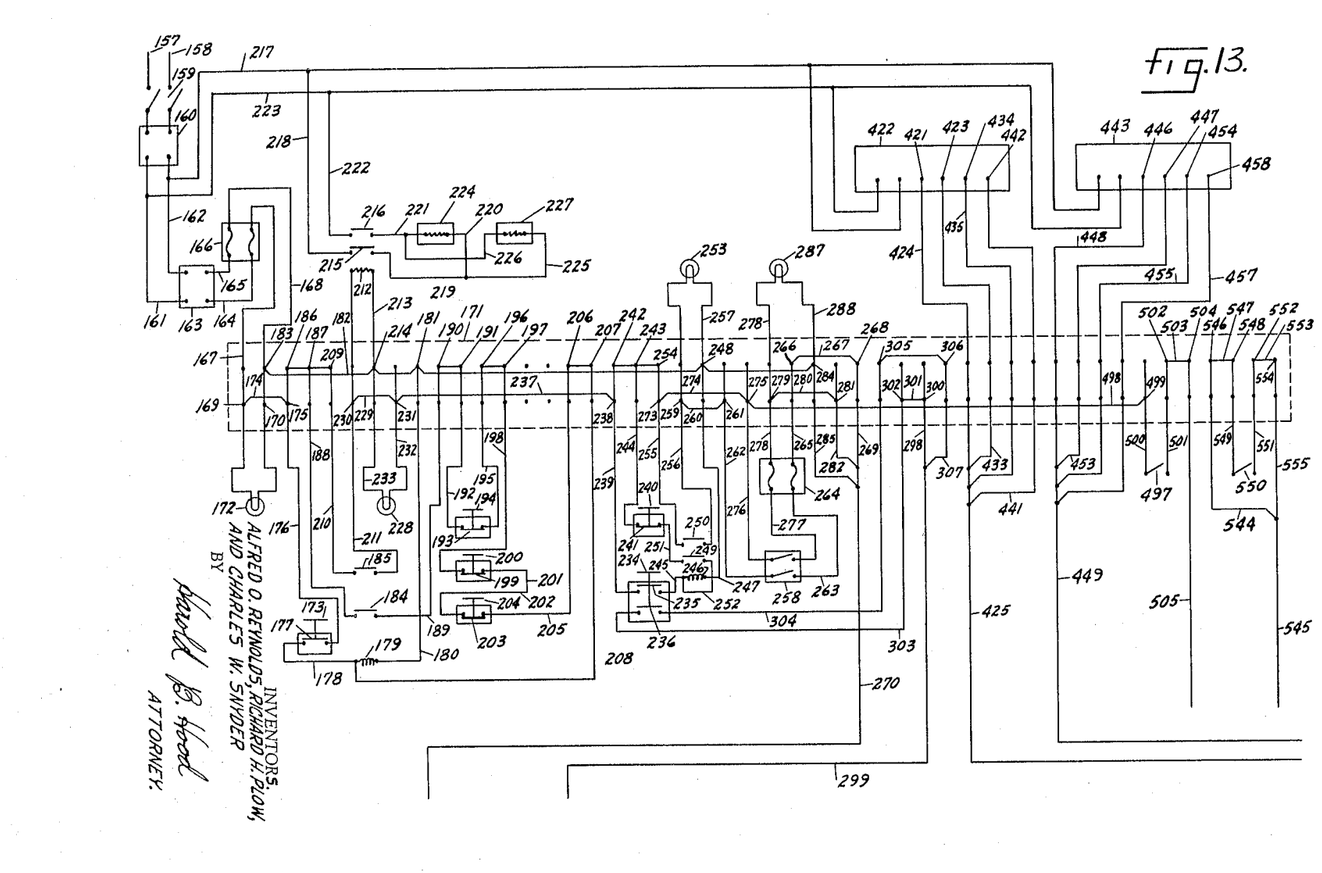
FIGS. 13 and 14, taken together, make up a wiring diagram showing the manner in which the operation of the machine is automatically controlled.

The further structure of the machine can best be described in conjunction with a description of its operation, based upon the schematic wiring diagram comprising FIGS. 13 and 14.

Line wires 157 and 158 lead, through a main switch 159 and a fuse box 160, to wires 161 and 162 through which the primary coil of a transformer 163 is energized upon closure of the switch 159. The secondary coil of the transformer is connected, by wires 164 and 165, through a fuse box 166, to wires 167 and 168 which, in turn, are electrically connected to terminals 169 and 170 of a panel board 171. A pilot light 172 burns whenever the transformer 163 is energized.

The first operation in starting the machine is to press the reset button 173. Thereby, a circuit is established from the transformer through wires 164 and 167 to terminal 169, thence through jumper 174 to terminal 175, wire 176, bridge-piece 177, wire 178, relay coil 179, wire 180 and terminal 181 to ground wire 182 which is connected to wire 168 at terminal 183. Energization of relay 179 closes bridge-pieces 184 and 185 against their terminals.

Closure of bridge-piece 184 establishes a circuit from the transformer through wire 164, wire 167, terminal 169, jumper 174, terminal 175, terminal 186, terminal 187, wire 188, bridge-piece 184, wire 189, terminal 190, terminal 191, wire 192, bridge-piece 193 of normally closed stop switch 194, wire 195, terminal 196, terminal 197, wire 198, bridge-piece 199 of normally closed stop switch 200, wire 201, wire 202, bridge-piece 203 of normally closed stop switch 204, wire 205, terminal 206, terminal 207, wire 208, relay coil 179, wire 180 and terminal 181, back to ground wire 182.

Thus, we provide a holding circuit for the relay coil 179, which circuit extends through the three (or more) stop switches 194, 200 and 204. The stop switches may be physically located at widely spaced points about the machine so that, wherever the operator may be, he may quickly reach a stop switch in case it becomes necessary to stop the machine for any reason.

Energization of the relay 179 also establishes a circuit through bridge-piece 185 as follows: from the transformer secondary coil through wire 164, wire 167, terminal 169, jumper 174, terminal 175, terminal 186, terminal 209, wire 210, bridge-piece 185, wire 211, relay coil 212 and wire 213 to the ground wire 182 at terminal 214. This circuit energizes relay coil 212 to close normally open bridge-pieces 215 and 216.

The bridge-pieces 215 and 216 are in the high voltage line, and their closure establishes a circuit from wire 162 through wire 217, wire 218, bridge-piece 215, wire 219, wire 220, wire 221, bridge-piece 216, wire 222 and wire 223 back to wire 161 to energize the main air line solenoid valve 224; and through wires 225 and 226 to energize a solenoid bleeder valve 227. Such energization, of course, opens the valve 224 and closes the valve 227 so that operating air is impressed upon the machine.

Closure of the bridge-piece 185 also energizes pilot light 228 through jumper 229 between terminals 230 and 231, wire 232 and wire 233 back to ground wire 182 at terminal 214. This light burns to show that the air pressure supply is open to the machine.

A normally open carriage start switch 234 comprises two bridge-pieces 235 and 236. Current reaches the switch, at the bridge-piece 235, through bridge-piece 185, wire 211, terminal 230, jumper 229, jumper 237, terminal 238 and wire 239.

A further stop switch 240 includes a bridge-piece 241 to which current may be delivered from terminal 238 through wire 239, terminal 242, terminal 243 and wire 244.

When the carriage start switch 234 is depressed, its bridge-piece 235 connects wire 239 with wire 245 to energize relay coil 246 through wire 247 which is connected to the ground wire 182 at terminal 248. Energization of coil 246 closes bridge-pieces 249 and 250 against their terminals. Bridge-piece 249 establishes a holding circuit for the coil 246 which extends from terminal 243 through wire 244, bridge-piece 241 of stop switch 240, wire 251, bridge-piece 249, wire 252, coil 246 and wire 247 to ground terminal 248. Closure of bridge-piece 250 energizes pilot light 253 through a circuit extending from terminal 243 to terminal 254, wire 255, bridge-piece 250, wire 256, lamp 253 and wire 257 to the ground wire at terminal 248. The lamp 253 burns to show that the carriage is ready to start.

Closure of bridge-piece 250 likewise supplies current to an off-run switch 258, from terminal 254 through wire 255, bridge-piece 250, wire 256, terminal 259, jumper 260, terminal 261 and wire 262. The off-run switch 259 is manually actuated; and, when it is closed, under the conditions described, power will flow through wire 262, switch 258, wire 263, fuse box 264, wire 265, terminal 266, jumper 267, terminal 268, wire 269 which extends through cable 270 to terminal 271 on the machine panel board 272 (FIG. 14). At the same time, closure of the switch 258 conducts power from terminal 254 through wire 255, terminal 273, jumper 274, terminal 275, wire 276, switch 258, wire 277, fuse box 264, wire 278, terminal 279, jumper 280, terminal 281, wire 282, cable 270 to terminal 283 of the board 272.

The ground wire 182 is also extended, from terminal 284 through wire 285 and cable 270 to terminal 286 of the board 272.

Closure of the off-run switch 258 also energizes pilot light 287 from terminal 279 through wire 278, and wire 288 back to the ground wire at terminal 284.

Switches 289, 290, 291, 292, 293 and 294 (FIG. 14) are connected in series with terminal 271, and all of these switches (except switch 294) must be closed before the carriage 20 can turn. Switch 289 is closed only when the transfer plugs 131 are in their fully retracted position. Switch 290 is closed only when the brake 152 is released. Switch 291 is closed only when the stop pin 154 is retracted. Switch 292 is closed only when the slurry tank 87 is in its lowermost position. Switch 293 is closed only when the plugs 114 are in fully retracted position. Switch 294 is closed momentarily by the bag unit carrier 95 just before it reaches the bottom of its stroke, thereby preparing the machine to proceed through another cycle.

When switches 289 to 293 are closed, the terminal 295 will be "hot." From that terminal, current may flow through jumper 296, terminal 297, wire 298 which leads through cable 299 to terminal 300, jumper 301, terminal 302, wire 303, bridge-piece 236 of starting carriage switch 234, wire 304, terminal 305, terminal 306, wire 307, cable 299, terminal 308, wire 309, relay coil 310 and wire 311 to the ground wire 312 at terminal 313. Bridge-pieces 314 and 315 are closed by energization of coil 310; and a holding circuit for the coil 310 is thereby established from terminal 271 through jumper 316, terminal 317, wire 318, normally closed switch 319, wire 320, terminal 321, jumper 322, terminal 323, wire 324, bridge-piece 314, wire 325, coil 310 and wire 311 to ground at terminal 313. Through bridge-piece 315, a circuit is energized to actuate motor 136 to move the transfer plate 134 forwardly, said circuit being traced from hot wire 324 through bridge-piece 315, wire 326, terminal 327, jumper 328, terminal 329, wire 330, electric actuator 331, wire 332 and wire 333 to ground wire 312 at terminal 334.

At the same time, a similar device 335 is energized to actuate motor 41 to move the rack 40 toward the right to advance the carriage 20, through a circuit which extends from the hot terminal 329 through wire 336, terminal 337, wire 338, solenoid 335, wire 335' and wire 333 to grounded terminal 334.

When the transfer plate 134 reaches the forward limit of its stroke, it closes normally open switch 339. Thereby, a circuit is established which may be traced from the hot terminal 283 through jumper 340 to terminal 341, wire 342, switch 339, wire 343, terminal 344, jumper 345, terminal 346, wire 347 to the opposite end of actuator 331 and thence through wires 332 and 333 to ground at terminal 344. Thereby, the motor 136 is actuated to retract the transfer plate 134.

Upon initial movement of the carriage 20, the switch 319 is opened thereby, and thus coil 310 is deenergized to permit the bridge pieces 314 and 315 to move away from their terminals. It may be noted at this point that all of the solenoid valves which control movements of the machine are of the momentary contact type so that, once any such valve is energized, it remains energized until it completes the stroke thus initiated.

Early in each movement of the carriage 20, it closes normally open stop switch 348 to establish a circuit from the hot terminal 283 through jumper 340 and jumper 349 to contact 350 and thence through wire 351, switch 348, wire 352, terminal 353, jumper 354, terminal 355, wire 356 to the actuator 155 for the stop pin, and thence through wire 357 and wire 333 to ground at 334, whereby the stop pin is advanced into the path of a carriage arm.

At the same time, the same movement of the carriage closes normally open switch 358 to establish a circuit from hot terminal 350 through jumper 359, terminal 360, wire 361, switch 358, wire 362, terminal 363, jumper 364, terminal 365, wire 366, to brake actuator 153 and thence, through wire 367 and wire 333 to ground terminal 334.

Now, with the carriage 20 stopped in proper registry with the operating stations, the mechanisms at those stations may be caused to operate.

Figure 4:
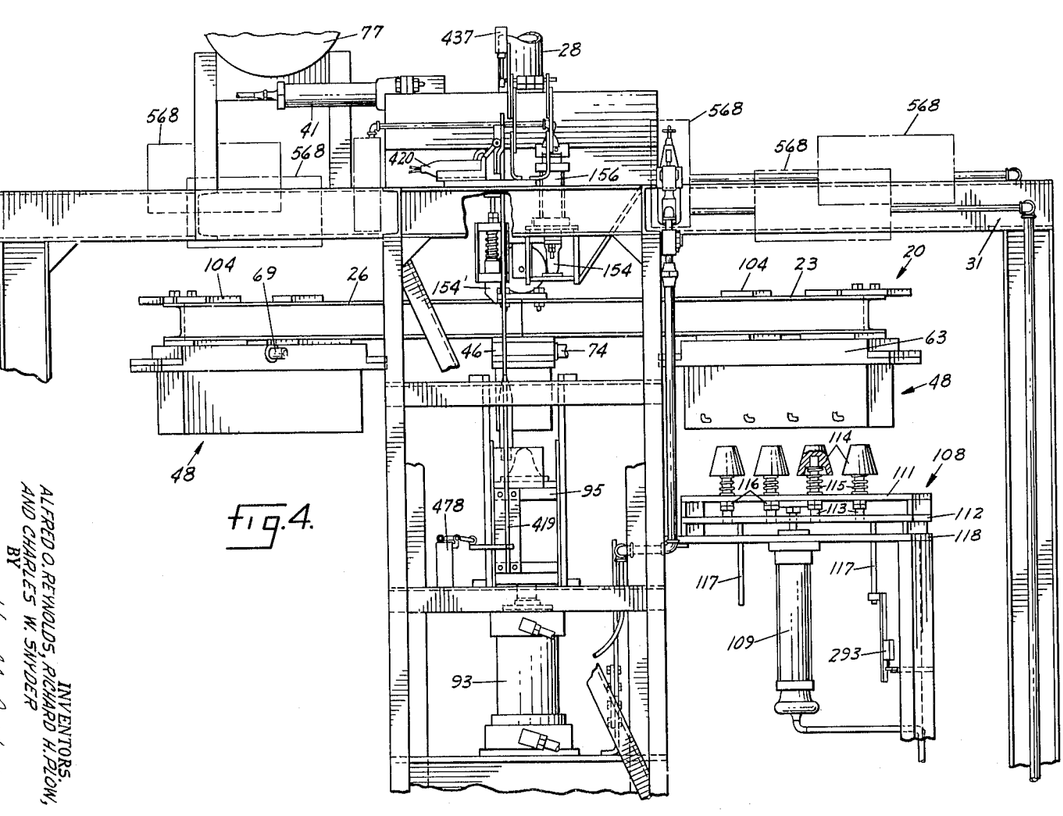
FIG. 4 is a fragmentary elevation of the lower portion of the machine taken substantially from the bottom of FIG. 1.
Figure 5:
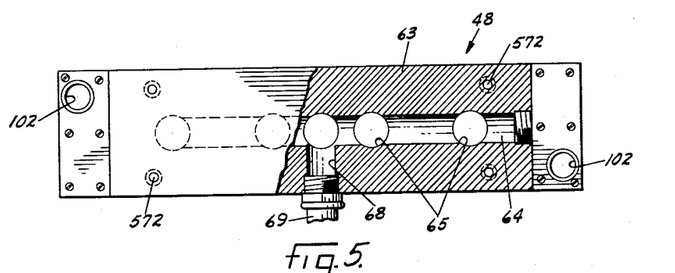
FIG. 5 is an enlarged plan of a mold assembly, shown partially in section.
Figure 6:
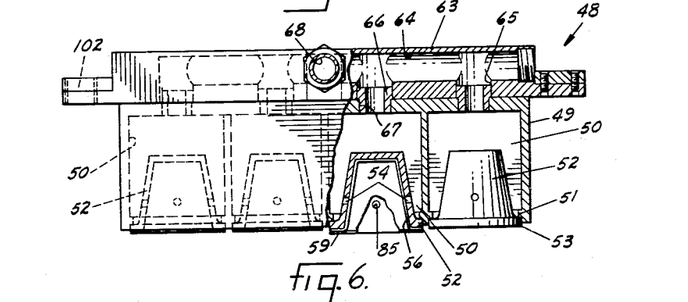
FIG. 6 is an elevation thereof, shown partially in section.
Figure 7:
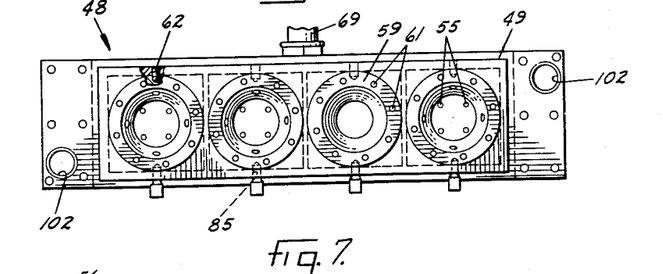
FIG. 7 is a bottom plan view thereof.

Upon completion of its return stroke, the transfer plate 134 closes normally open switch 368 to establish a circuit from hot terminal 360 through jumper 369, terminal 370, wire 371, switch 368, wire 372, terminal 373, jumper 374, terminal 375, wire 376, normally open switch 377 (which has been closed by the setting of the brake), wire 378, terminal 379, jumper 380, terminal 381, wire 382, normally open switch 383 (which has been closed by the stoppage of the carriage 20 in a proper position), wire 384, terminal 385, jumper 386, terminal 387, wire 388, normally open switch 389 (which has likewise been closed by the attainment of a proper stop position by the carriage 20), wire 390, terminal 391, jumper 392, terminal 393, wire 394, normally open switch 395 (which has been closed by movement of latch 154' to the position of FIG. 4), wire 396, relay coil 397 and wire 398 to ground at terminal 399. Energization of coil 397 closes bridge-piece 400 upon its terminals.

Closure of bridge-piece 400 energizes a plurality of circuits as follows:

From hot terminal 370 through wire 401, bridgepiece 400, wire 402, terminal 403, jumper 404, terminal 405, wire 406 to the opposite end of the actuator 335 and thence through wire 335' and wire 333 to ground at terminal 334. This circuit retracts rack 40; but it will be remembered that the driving connection between the pinions 38 and 39 is effective to rotate the shaft only in a counter-clockwise direction, so that such retraction of the rack 40 does not affect the shaft.

Likewise from terminal 370, wire 401, bridge-piece 400, wire 402, terminal 403, jumper 404, terminal 405, wire 407, terminal 408, wire 409 to the opposite end of actuator 153 and thence through wires 367 and 333 to ground at 334. This circuit releases the brake 152.

Also, a circuit is established from the hot terminal 370 through wire 401, bridge-piece 400, wire 402, terminal 403, jumper 404, terminal 405, wire 407, terminal 410 and wire 411 to actuator 94 for the bag press unit motor 93 and thence through wires 412 and 333 to ground at 334. The bag unit carrier 95 will thus be raised into cooperative association with the core box which is currently in registry therewith.

In the same fashion, through bridge-piece 400, a circuit is established to terminal 413 and thence through wire 414 to actuator 91 for slurry tank motor 90, wire 415 and wire 333 to ground at 334. Thus, the slurry tank will be raised into cooperative association with the core box registering therewith.

A similar circuit may be traced to terminal 416 and through wire 417 to actuator 110 for the motor 109 which actuates the plug carrier 108 and, through wire 418, and wire 333 back to ground at 334. The plugs 114 are thus raised into retaining engagement with the articles in the core box which currently registers with said plugs.

Fixed to move with the bag unit carrier 95 is a control rod 419 (FIG. 4). As the bag unit starts upwardly, it closes switch 420 to establish a circuit connecting terminal 421 (FIG. 13) of a timer unit 422 with the terminal 423 thereof. That circuit is traced from terminal 421 through wire 424, which extends through cable 425, to terminal 426 of panel 427, and thence through wire 428, switch 420, wire 429, terminal 430, jumper 431, terminal 432, and wire 433 back through cable 425 to terminal 423 of the timer unit. The unit 422 is a commercial timer device, including an adjuster for preselecting the period of time during which, once it is energized, power will be delivered through such unit; and during that period, power will be delivered from the unit 422 in a circuit which may be traced from terminal 434 through wire 435, cable 425, wire 435, switch 437 (which is closed by the rod 419 when the latter reaches the top of its stroke), wire 438, switch 437' (which is likewise closed as the rod 419 reaches the top of its stroke), wire 440, solenoid valve 100, wire 441, cable 425 to terminal 442 of unit 422. Energization of the solenoid 100 opens the valve to supply air under pressure to the bags 96, whereby said bags are expanded, under heavy pressure, into intimate contact with the inner surface of the layer of pulp or fiber which has been deposited upon the mold forms at the preceding station. Because of the extreme flexibility and extensibility of the bag walls, uniform pressure may thus be applied over the entire surface of the layer of pulp, in spite of the variations in configuration thereof. It will be understood, of course, that the interiors of the mold cavities 50 are, at this time, open to the vacuum tank, so that any moisture which may be expressed from the pulp layer by pressure of the bags, will be evacuated from the core box.

Another timer unit 443 (FIG. 13) controls energization of a relay coil 444. A normally open switch 445 is closed when the rod 419 reaches its uppermost position, providing a circuit connecting terminals 446 and 447 of the unit 443 through wire 448, cable 449, wire 450, switch 445, wire 451, jumper 452, wire 453 and through cable 449 to terminal 447. The unit 443 is so constructed that after a predetermined period of time following closure of the switch 445, power will be supplied, from the high voltage line, from its terminal 454 through wire 455, cable 449, wire 456, relay coil 444 and wire 457 back through cable 449 to terminal 458. Energization of relay coil 444 closes bridge-pieces 459 and 460 upon their terminals.

It will be remembered that wire 340 connects with hot terminal 283. Said wire is also connected with terminal 461. Closure of bridge-piece 459 establishes a circuit from terminal 461 through wire 462, bridge-piece 459, wire 463, terminal 464, jumper 465, terminal 466, wire 467 to the opposite end of actuator 155 and thence through wires 357 and 333 to ground at 334. Thereby, the stop pin 154 will be raised.

At the same time, a circuit is established from the terminal 466 through pumper 468 to terminal 469 and thence by wire 470 to the opposite end of actuator 94 and through wires 412 and 333 to ground at 334. This circuit actuates the bag unit motor 93 to lower the bag carrier.

Jumper 471 connects terminal 469 with terminal 472 from which wire 473 leads to the opposite end of the actuator 91 for the slurry tank motor to lower that tank. From terminal 472, wire 474 leads to terminal 475 whence wire 476 leads to the actuator 138 for the motor 124 to lower the transfer plugs 139, the circuit being completed through wires 477 and 333 to ground at 334.

As the rod 419 descends, it trips the normally open switch 478 to close a circuit from terminal 479, to which the wire 340 is connected, through wire 480, switch 478, wire 481, terminal 482, jumper 483, wire 484 to the opposite end of actuator 110 and thence through wires 418 and 333 to ground at 334. Thus, the plugs 114 are lowered.

Electrically-actuated valves 73 and 71 (FIG. 1) on each arm 21 to 26 are controlled by a set of solenoids (FIG. 14) 489, 491, 519, 541 and 559; and these, in turn, are dominated by brushes 488, 495, 518, 540 and 558 bearing on commutator rings 570 and 571 (FIG. 11) carried on a hub section of the plate 43.

Closure of the bridge-piece 459 also provides a circuit which may be traced from said bridge-piece through wire 463, terminal 464, wire 485, terminal 486, wire 487, brush 488 and solenoid 489 to ground at 490. Energization of solenoid 489 opens the air valve 71 on that arm which is in registry with the transfer mechanism 123, to dislodge the formed articles from that mold box and deposit them on the transfer plugs 131.

The solenoid 491 will be energized through a circuit extending from terminal 486 through jumper 492, terminal 493, wire 494, brush and the solenoid to ground at 496. This opens the air valve 71 on that arm which is currently in registry with plugs 114 to loosen the articles from the mold forms. Plugs 114, of course, restrain the articles against discharge from the mold forms; and, since the corresponding vacuum valve 75 is still open, when the blast is discontinued and the plugs 114 are subsequently retracted, the articles will be retained in the mold forms.

A manually-actuated snap switch 497, when closed, establishes a circuit from hot terminal 275 through jumper 498, terminal 499, wire 500, switch 497, wire 501, terminal 502, pumper 503, terminal 504, wire 505, terminal 506, wire 507, switch 508 (which is held closed when the carriage 20 is in any proper stop position), wire 509, manual snap switch 510, wire 511, terminal 512, jumper 513, terminal 514, jumper 515, terminal 516, wire 517, brush 518 to solenoid 519 and ground at 520 to open the valve 71 on the arm currently over the wash tank, to direct a blast of air through the mold cavities of its core box. This gives an opportunity for a manually controlled air blast at the wash station. However, if the switch 523 is closed, such a blast will be provided through a circuit which may be traced through switch 497 and wire 505 to terminal 506, jumper 521, terminal 522, switch 523, terminal 524, wire 525, bridge-piece 534 and wire 527 to terminal 516 and thence through wire 517 and brush 518 to the valve actuator 519.

Bridge-piece 526 is closed through a circuit extending through bridge-piece 460 of relay 444 and through wire 528, relay coil 529 and wire 530 to terminal 531 and so, through jumper 532, to ground at terminal 533. Bridge-piece 534 provides a holding circuit for coil 529. Thus, an automatic air blast to the mold cavities at the wash station is provided when that station is reached.

Also through the switch 508, a circuit may be traced from terminal 535 through jumper 536, terminal 537, manual snap switch 538 and wire 539 to brush 540 and solenoid 541 to open water valve 73 to direct wash water through the mold cavities of a core box at the wash station.

Swith 508 is held closed for so long as the carriage 20 is stationary, while the switch 538 is manually controlled so that the wash water can be cut off in case the machine stands stationary for a long period, as, for instance, for repair or adjustment.

Also through the switch 508, a circuit may be traced through wire 509, terminal 535, jumper 536, terminal 537, jumper 542, terminal 543, wire 544, cable 545, wire 544, terminal 546, jumper 547, terminal 548, wire 549, switch 550, wire 551, terminal 552, jumper 553, terminal 554, wire 555 through cable 545, wire 555, tereminal 556, wire 557, brush 558, solenoid 559 and wire 560 to terminal 531 which is grounded. Solenoid 559 controls the valve for supplying water to the ejector tubes 146. Thus, water is supplied, through those tubes, to wash the interiors of the mold forms at the wash station, for so long as switches 508 and 550 are closed.

When the bag carriage reaches the bottom of its stroke, carrying with it the rod 419, switches 289, 290, 291, 292 and 293 will have been closed, in the manner above-described, to advance the rack 40 and move the carriage 20 through 60°. As the carriage starts, switch 523 will be opened to deenergize the relay coil 529 to cut off all air blasts, and the switch 508 will be opened to cut off water supplies.

We claim as our invention:

1. In a machine of the class described, a shaft mounted for rotation about a vertical axis, a plurality of arms arranged about said axis in relatively-fixed substantially equiangularly spaced relation and radiating from said shaft for travel therewith, a core box depending from each arm and carrying a cupped, foraminous mold presenting its external surface to the interior of said core box and its internal surface to the atmosphere a feed station, a compression station, a freeing station, an intermediate station, a discharge station and a wash station arranged in an equiangularly spaced series about said axis for successive registration of said core boxes therewith, means for advancing said shaft and said arms, step-by-step, in one direction to bring each of said arms successively into registry with said stations, a source of vacuum, means connected with each core box and open to said vacuum source as said core box progresses from said feed station beyond said freeing station, means effective as each core box approaches said discharge station to close communication between said core box and said source of vacuum, means at said feed station for lifting a slurry tank into coactive association with the mold of an arm in registry therewith and for subsequently lowering said tank before the next step of said shaft, means at said compression station for entering an inflatable bag in a mold in registry therewith, for inflating said bag with fluid under pressure during such registry and for withdrawing said bag before the next step of said shaft, means at said freeing station for entering a plug in a mold in registry therewith, for directing a blast of air from the interior of said core box through said mold while said plug is positioned therein, and for withdrawing the same before the next step of said shaft, the vacuum reestablished in said core box upon discontinuance of said blast acting to retain such article in said mold after withdrawal of said plug, means at said discharge station for entering a plug in a mold in registry therewith, delivering an article from said mold to said plug and withdrawing said plug and said article from said mold before the next step of said shaft, means at said wash station for directing a stream of liquid to the interior of a core box in registry therewith and discontinuing such delivery before the next step of said shaft, and automatic means dominating all of said means to carry the same continuously through the defined cycle.

2. In a machine of the class described, a mold, means for carrying said mold, step-by-step, through procedure resulting in the production of a molded article having a downwardly-presented, open mouth, a conveyor, and mechanism for transferring said article from said mold to said conveyor comprising a plate mounted just above the plane of said conveyor, said plate being formed with a perforation therethrough slightly smaller than the external dimension of said article mouth, a plug having an external dimension slightly less than that of said perforation, said plug being normally disposed below said plate, means for moving said plug upwardly through said perforation and into an article supported in said mold, means for freeing said article from said mold and depositing the same on said plug, means for thereupon retracting said plug through said perforation to deposit said article on said plate, means effective thereafter to move said plate forwardly to a position overlying a portion of said conveyor, and means for suddenly jerking said plate rearwardly from beneath said article, the inertia of said article restraining it from entrainment with the sudden rearward movement of said plate, to deposit said article on said conveyor.

3. In a machine of the class described, a radiating series of equiangularly spaced arms, means for rotating said arms step-by-step about a central, vertical axis, a mold box carried by each arm and supporting a downwardly-opening mold, means for depositing a layer of fibrous material on the inner surface of a mold, means at a point in the path of said arms angularly spaced from said depositing means for subsequently applying uniform pressure over the whole inner surface of such layer, means at a point in said path spaced beyond said pressure applying means for subsequently providing mechanical support for the inner surface of such layer while applying superatmospheric gaseous pressure, through said mold, to the external surface of such layer to free said layer from said mold, means for applying subatmospheric pressure, through said mold, to the external surface of such layer, means for thereupon withdrawing said mechanical support from the internal surface of said layer, and means for subsequently discharging said layer from said mold.

4. In a machine of the class described, including a shaft, a plurality of operating stations arranged in a peripheral series about the axis of said shaft, a series of angularly-spaced mold boxes supported from said shaft to move, with said shaft, from station to station in a continuous cycle, and a motor for driving said shaft step-by-step, the invention which comprises a first electrical means dominating the operation of said motor, operating means at said stations, a second electrical means dominating the operation of said operating means, means dominated by said operating means to prevent operation of said motor to drive said shaft during the operating cycle of said operating means, electric circuit means controlling the operation of the machine, a stop switch in said circuit, and holding relay means effective, when said stop switch is opened during the cycle of said operating means, to maintain energization of said second electrical means only until completion of such cycle.

5. In a machine of the class described, a shaft mounted for rotation about a vertical axis, a plurality of arms arranged about said axis in relatively-fixed, substantially equiangularly spaced relation and radiating from said shaft for travel therewith, a core box depending from each arm and carrying a cupped, foraminous mold presenting its external surface to the interior of said core box and its internal surface to the atmosphere, a feed station, a freeing station, a discharge station and a wash station arranged about said axis and spaced thereabout for simultaneous registration of certain of said core boxes and successive registration of each of said core boxes therewith, means for advancing said shaft and said arms, step-by-step, in one direction to bring each of said arms successively into registry with said stations, a source of vacuum, means connected with each core box and open to said vacuum source as said core box progresses from said feed station beyond said freeing station, means effective as each core box approaches said discharge station to close communication between said core box and said source of vacuum, means at said feed station for effecting relative movement between a slurry tank at said station and the mold of an arm in registry therewith to immerse such mold in the slurry in said tank, for causing a layer of material from the slurry to be deposited on the internal surface of said mold, and for subsequently reversing such relative movement before the next step of said shaft, means at said freeing station for entering a plug in a mold in registry therewith to support an article in said mold, for directing a temporary blast of fluid into the interior of the associated core box while said plug is positioned in said mold to loosen such article in said mold, and for withdrawing said plug before the next step of said shaft, the vacuum reestablished in said core box upon discontinuance of said blast acting to retain such article in said mold after withdrawal of said plug, means at said discharge station for entering a plug in a mold in registry therewith, for delivering an article from said mold to said plug, and for withdrawing said plug and said article from said mold before the next step of said shaft, means at said wash station for delivering a stream of liquid to the interior of a core box in registry therewith and discontinuing such delivery before the next step of said shaft, and automatic means dominating all of said means to carry the same continuously through the defined cycle.

6. In a machine of the class described, a shaft mounted for rotation about a vertical axis, a plurality of arms arranged about said axis in relatively-fixed, substantially equiangularly spaced relation and radiating from said shaft for travel therewith, a core box depending from each arm and carrying a cupped, foraminous mold presenting its external surface to the interior of said core box and its internal surface to the atmosphere, a feed station, a compression station, a discharge station and a wash station arranged about said axis and spaced thereabout for simultaneous registration of certain of said core boxes and successive registration of each of said core boxes therewith, means for advancing said shaft and said arms, step-by-step, in one direction to bring each of said arms successively into registry with said stations, a source of vacuum, means connected with each core box and open to said vacuum source as said core box progresses from said feed station beyond said compression station, means effective as each core box approaches said discharge station to close communication between said core box and said source of vacuum, means at said feed station for effecting relative movement between a slurry tank at said station and the mold of an arm in registry therewith to immerse such mold in the slurry in said tank, for causing a layer of material from the slurry to be deposited on the internal surface of said mold, and for subsequently reversing such relative movement before the next step of said shaft, means at said compression station for entering an inflatable bag in a mold in registry therewith, for inflating said bag to compress a layer of material within said mold, and for deflating and withdrawing said bag before the next step of said shaft, means at said discharge station for entering a plug in a mold in registry therewith, for delivering an article from said mold to said plug, and for withdrawing said plug and said article from said mold before the next step of said shaft, means at said wash station for delivering a stream of liquid to the interior of a core box in registry therewith and thence outwardly through the mold in said core box, and for discontinuing such delivery before the next step of said shaft, and automatic means dominating all of said means to carry the same continuously through the defined cycle.

7. In a machine of the class described, a shaft mounted for rotation about a vertical axis, a plurality of arms arranged about said axis in relatively-fixed, substantially equiangularly spaced relation and radiating from said shaft for travel therewith, a core box depending from each arm and carrying a mold, a feed station, a compression station, a freeing station, and a discharge station arranged about said axis and spaced thereabout for simultaneous registration of certain of said core boxes and successive registration of each of said core boxes therewith, a source of vacuum, means connected with each core box and open to said vacuum source as said core box progresses from said feed station beyond said freeing station, means for advancing said shaft and said arms, step-by-step, in one direction to bring each of said arms successively into registry with said stations, means at said feed station for effecting relative movement between a slurry tank at said station and the mold of an arm in registry therewith to immerse such mold in the slurry in said tank, for causing a layer of material from the slurry to be deposited on said mold, and for subsequently reversing such relative movement before the next step of said shaft, means at said compression station for entering an inflatable bag in a mold in registry therewith, for inflating said bag to compress a layer of material within said mold, and for deflating and withdrawing said bag before the next step of said shaft, means at said freeing station for entering a plug in a mold in registry therewith, for directing a blast of fluid temporarily into the core box of said mold only while said plug is positioned therein to loosen an article in said mold, and for withdrawing said plug before the next step of said shaft, means at said discharge station for entering a plug in a mold in registry therewith, for delivering an article from said mold to said plug, and for withdrawing said plug and said article from said mold before the next step of said shaft, and automatic means dominating all of said means to carry the same continuously through the defined cycle.

8. In a machine of the class described, a series of molds, each comprising means providing a chamber and a foraminous mold form disposed generally in said chamber and having an open mouth, means for carrying said molds, step-by-step, to a plurality of successively-arranged operating stations including an article-forming station at which a layer of fibrous material is deposited on that surface of a mold form which communicates with the mouth thereof, and an article-freeing station, a source of vacuum, means connected with each such chamber and open to said vacuum source as said chamber progresses from said feed station beyond said freeing station, said article-freeing station comprising a carrier, a pin resiliently supported from said carrier for reciprocation relative thereto, a plug supported from said pin and disposed, when one of said molds is in registry with said freeing station, in aligned registry with the mouth of its mold core, means for effecting relative movement between said mold and said carrier to enter said plug, through said open mouth, into supporting engagement with said layer, means acting during such engagement to raise the fluid pressure within said chamber momentarily to a value above atmospheric pressure, and means acting after discontinuance of such action to reverse such relative movement to withdraw said plug from said mold.

9. In a machine of the class described, a series of molds, each comprising means providing a chamber and a foraminous mold form disposed generally in said chamber and having an open mouth, means for carrying said molds, step-by-step, to a plurality of successively-arranged operating stations including an article-forming station at which a layer of fibrous material is deposited on that surface of a mold form which communicates with the mouth thereof, and an article-freeing station, said article-freeing station comprising a carrier, a pin resiliently supported from said carrier for reciprocation relative thereto, a plug supported from said pin and disposed, when one of said molds is in registry with said freeing station, in aligned registry with the mouth of its mold core, means for effecting relative movement between said mold and said carrier to enter said plug, through said open mouth, into supporting engagement with said layer, means acting during such engagement to raise the fluid pressure within said chamber momentarily to a value above atmospheric pressure, means acting thereafter to reduce the fluid pressure within said chamber to a value below atmospheric pressure, and means acting thereafter to reverse such relative movement to withdraw said plug from said mold.

10. In a machine of the class described, a series of molds, each comprising means providing a chamber and a foraminous mold form disposed generally in said chamber and having a downwardly-opening mouth, means for carrying said molds, step-by-step, to a plurality of successively-arranged operating stations including an article-forming station at which a layer of fibrous material is deposited on that surface of a mold form which communicates with the mouth thereof, and an article-freeing station, said article-freeing station comprising a carrier, a pin mounted in said carrier for reciprocation relative thereto and projecting upwardly therefrom, spring means sleeved on said pin and resiliently supporting said pin against downward movement relative to said carrier, a plug, proportioned and designed externally substantially to conform to the internal shape of said mold core, supported from the upper end of said pin and disposed, when one of said molds is in registry with said freeing station, in aligned registry with the mouth of its mold core, a reciprocating fluid motor supporting said carrier, means actuated when a mold is in such registry with said plug to energize said motor to lift said carrier to enter said plug, through said open mouth, into supporting engagement with said layer, means acting during such engagement to raise the fluid pressure within said chamber momentarily to a value above atmospheric pressure, source of vacuum, means connected to each such chamber and open to said vacuum source after cessation of such action, and means acting after evacuation of such chamber to reverse the movement of said motor to withdraw said plug from said mold.

References Cited in the file of this patent

UNITED STATES PATENTS

| | | |
|---|---|---|
| 1,169,064 | Ayerst | Jan. 18, 1916 |
| 1,364,228 | Williamson | Jan. 4, 1921 |
| 1,956,975 | Belcher | May 1, 1934 |
| 1,983,324 | Swift | Dec. 4, 1934 |
| 2,006,831 | Hawley | July 2, 1935 |
| 2,183,869 | Randall | Dec. 19, 1939 |
| 2,234,979 | Randall et al. | Mar. 18, 1941 |
| 2,245,678 | Keiding | June 17, 1941 |

FOREIGN PATENTS

| | | |
|---|---|---|
| 425,092 | Germany | Feb. 13, 1926 |
| 585,778 | Great Britain | Feb. 24, 1947 |